United States Patent Office 3,177,207
Patented Apr. 6, 1965

3,177,207
BIS-TRIAZINYLAMINO-STILBENE COMPOUNDS
Edgar Siegel, Leverkusen, Heinrich Gold, Cologne-Stammheim, and Anton Schlachter and Josef Hegemann, Leverkusen, Germany, assignors to Farbenfabriken Bayer Aktiengesellschaft, Leverkusen, Germany a corporation of Germany
No Drawing. Filed June 4, 1958, Ser. No. 739,661
Claims priority, application Germany, June 5, 1957,
F 23,176, F 23,177
1 Claim. (Cl. 260—240)

The present invention relates to bis-triazinylamino-stilbene compounds; more particularly it concerns bis-triazinylamino-stilbene compounds of the general formula

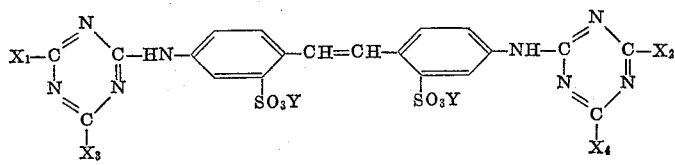

wherein $X_1$, $X_2$ and $X_3$ stand for the radicals of aromatic amines, and $X_4$ for $NH_2$ or for the radical of an aliphatic or araliphatic amine, whereas Y represents hydrogen or an inorganic or organic cation such as sodium, potassium, calcium, $NH_4$ or an aliphatic amine. The amine radicals may be substituted, for instance by alkyl groups, fluorine or chlorine, hydroxyl or alkoxy groups, sulfone groups and acid groups or groups derived therefrom, e.g., carboxylic, nitrile, sulfonic and sulfonamide groups.

The bis-triazinylamino-stilbene compounds of the present invention which in general show a bluish fluorescence in daylight can be used as optical bleaching agents in a manner known per se; they go surprisingly well on materials made of cellulose fibres as well as on materials made of polyamide fibres from neutral and alkaline treating baths. Washing agents which contain such optical bleaching agents can therefore be used for textile materials of polyamide fibres, even if the washing agents show an alkaline reaction. By adapting the washing method in the usual manner to the kind of the fibres of the textile materials, a whitening effect is obtained which in both cases is highly satisfactory. Such a result could not be obtained by using the optical bleaching agents hitherto known.

The compounds of the present invention can be prepared by various methods, for instance in the following manner: in the first stage at 0–10° C. 2 mols of cyanuric chloride are condensed with 1 mol of 4,4-diaminostilbene-2,2-disulfonic acid, in the second stage at 10–40° C. the next two chlorine atoms are replaced by the radicals of suitable aromatic amines and thereupon in the third stage at 70–98° C. one of the two chlorine atoms still present in the triazine rings is likewise replaced by the radical of a suitable aromatic amine, whereas the other chlorine atom is replaced by the $NH_2$-group or by the radical of an aliphatic or araliphatic amine.

Especially suitable optical bleaching agents are the bis-triazinylamino-stilbene compounds of the abovementioned general formula, wherein $X_1$, $X_2$ and $X_3$ stand for the radical $—NH.C_6H_5$ and $X_4$ for $NH_2$ or the radical of an aliphatic or araliphatic amine, for instance for one of the following radicals:

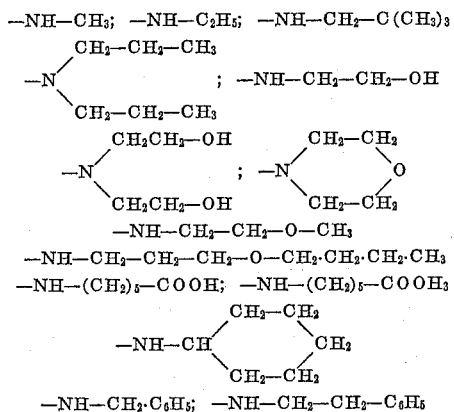

Other suitable optical bleaching agents of the abovementioned general formula are indicated in the following table:

TABLE

| | $X_1$ | $X_2$ | $X_3$ | $X_4$ |
|---|---|---|---|---|
| 1. | $—NH—C_6H_5$ | $—NH—C_6H_5$ | $—NH—\langle\ \rangle—CH_3$ | $—NH_2$ |
| 2. | $—NH—C_6H_5$ | $—NH—C_6H_5$ | $—NH—\langle\ \rangle—CH_3$ | $—NH—CH_2—C_6H_5$ |
| 3. | $—NH—C_6H_5$ | $—NH—C_6H_5$ | $—NH—\langle\ \rangle$ (Cl) | $NH—C_2H_5$ |
| 4. | $—NH—C_6H_5$ | $—NH—C_6H_5$ | $—NH—\langle\ \rangle—OCH_3$ | $—NH—CH_3$ |
| 5. | $—NH—C_6H_5$ | $—NH—C_6H_5$ | $—NH—\langle\ \rangle$ ($SO_3Na$) | $—NH—CH_2—C(CH_3)_3$ |
| 6. | $—NH—C_6H_5$ | $—NH—C_6H_5$ | $—NH—\langle\ \rangle$ (COONa) | $—N(CH_2CH_2OH)_2$ |

TABLE—Continued

| | $X_1$ | $X_2$ | $X_3$ | $X_4$ |
|---|---|---|---|---|
| 7. | —NH—C₆H₄—Cl | —NH—C₆H₄—Cl | —NH—C₆H₅ | —NH—CH₃ |
| 8. | —NH—C₆H₄—Cl | —NH—C₆H₄—Cl | —NH—C₆H₅ | —NH—CH₃ |
| 9. | —NH—C₆H₄—SO₂—NH₂ | —NH—C₆H₄—SO₂—NH₂ | —NH—C₆H₅ | —NH—CH₃ |
| 10. | —NH—C₆H₄(CH₂OH)(CH₂—SO₂NH) | —NH—C₆H₄(CH₂OH)(CH₂—SO₂NH) | —NH—C₆H₅ | —NH—CH₃ |
| 11. | —NH—C₆H₄—Cl | —NH—C₆H₄—Cl | —NH—C₆H₄—Cl | —NH—CH₃ |

The quantity of the optical bleaching agents required can readily be determined by preliminary tests.

The following examples serve to further illustrate the present invention without, however, limiting the scope thereof; the parts given are by weight.

*Example 1*

A washing powder which contains about 50 percent by weight of ordinary soap and the usual components such as complex forming phosphates, sodium carbonate and alkali silicates, is mixed with 0.1 percent by weight of the optical bleaching agent of the formula

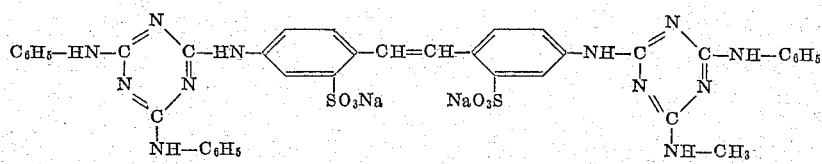

in a manner known per se. Textile materials of cotton or linen are then washed with the washing powder thus obtained in the usual manner—preferably at temperatures between 80 and 100° C. The textile materials show an excellent brightening effect.

Textile materials of polyamide fibres can be washed in the usual manner with the same washing powder containing the aforesaid optical bleaching agent, preferably at temperatures up to 60° C. The textile materials thus treated likewise show an excellent optical bleaching effect, although the washing bath has a pH value of about 10.

The optical bleaching agent used was prepared in the following manner:

7500 parts of an ice-water mixture were mixed at 0–2° C. with a solution of 369 parts of cyanuric chloride in 4400 parts of acetone; to the suspension of the cyanuric chloride obtained there was added at 3–5° C. the neutral solution of 429 parts of the sodium salt of 4,4-diamino-stilbene-2,2'-disulfonic acid in 3500 parts of water. The mineral acid formed during this first condensation stage was neutralized with sodium carbonate solution until the pH value 7 was reached. After the diamino-stilbene-disulfonic acid was completely reacted, 192 parts of aniline were added to the reaction mixture and the hydrochloric acid formed was likewise neutralized with sodium carbonate solution until the pH value 7 was reached. This second condensation stage was completed by slowly heating the reaction mixture to 35° C. while keeping the pH value at 7. For carrying out the third condensation stage, 32.1 parts of methyl amine in the form of an about 30 percent aqueous solution and 332 parts of aniline were added to the reaction mixture and the mixture was boiled under reflux for 2 hours, whereupon the acetone was distilled off and the remaining solution stirred for 4 hours at 98° C. The pH value of the hot mixture was then adjusted to 5–6 with hydrochloric acid and the mixture was stirred for 1 hour at 80–90° C. The light yellow powdery precipitate was filtered off with suction while hot, washed with hot water and dried; it was applied as optical bleaching agent in the form of a mixture with about 10–20 percent of calcined sodium carbonate.

*Example 2*

A washing agent which contains about 30 percent by weight of synthetics such as alkyl aryl sulfonates and/or fatty alcohol sulfonates, 5–10 percent by weight of complex forming phosphates, 65–60 percent by weight of sodium sulfate and 0.3 percent by weight of the optical bleaching agent of the formula

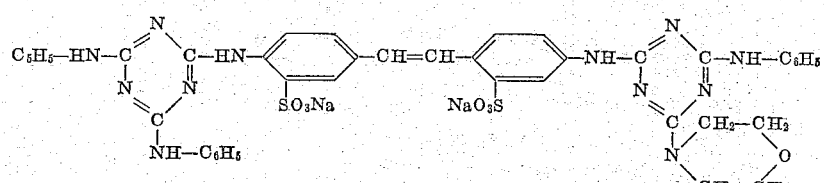

is used in the usual manner for washing laundry goods of regenerated cellulose or polyamide fibres. The washing bath has a pH value of about 8. An excellent whitening effect is obtained on undyed laundry goods, whereas laundry goods dyed in light pastel shades appear to be more brilliant.

The optical bleaching agent used was prepared according to Example 1 except that in the third condensation stage, besides 332 parts of aniline, 88.5 parts of morpholine were applied instead of the aqueous solution of 32.1 parts of methylamine.

With the same result a washing agent of the above-mentioned type containing 0.3 percent by weight of the optical bleaching agent of the formula

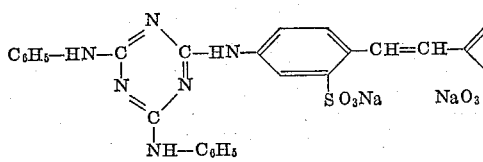 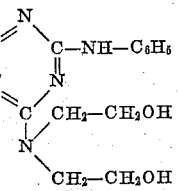

can be used for washing laundry goods of regenerated cellulose or polyamide fibres.

This optical bleaching agent can be prepared according to Example 1 except that in the third condensation stage, besides 332 parts of aniline, 137 parts of diethanol amine were applied instead of the aqueous solution of 32.1 parts of methylamine.

*Example 3*

A soap base serving for the manufacture of soap flakes is treated in a mixing apparatus, prior to working up in a soap mill, with 0.2 percent by weight of the optical bleaching agent of the formula

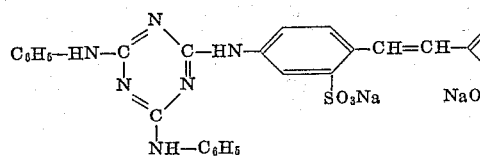 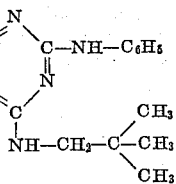

emulsified in concentrated aqueous soap solution. Laundry goods of cellulose fibres of any kind or of polyamide fibres which are washed with the soap flakes in the usual manner show a whiteness which is remarkably brighter than the same textile goods washed with soap flakes not containing the optical bleaching agent.

The optical bleaching agent emulsified in concentrated soap solution can also be added to the suds serving for the production of curd soap. Laundry goods of cellulose fibres or polyamide fibres which are washed with a soap thus obtained show likewise an excellent brightening effect.

The optical bleaching agent used was prepared according to Example 1 except that in the third condensation stage, besides 332 parts of aniline, 88.5 parts of neopentyl-amine were applied instead of the aqueous solution of 32.1 parts of methylamine.

*Example 4*

3–4 parts of the optical bleaching agent of the formula

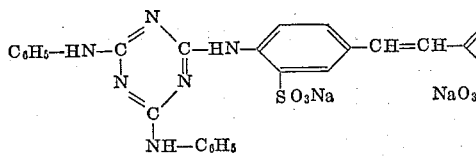 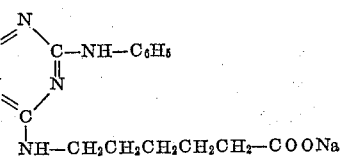

are worked into a rinsing agent which contains complex forming phosphates, sodium silicates, sodium bicarbonate and sodium sulfate, and which serves for removing residues of calcium soaps or the like.

Laundry goods of cellulose fibres or polyamide fibres which are rinsed in a bath of about 40° C. containing a rinsing agent of the aforementioned type show an essentially increased brightness if compared with laundry goods which are treated under equal conditions with a rinsing agent which does not contain the optical bleaching agent.

The optical bleaching agent used was prepared according to Example 1 except that in the third condensation stage, besides 332 parts of aniline, an aqueous solution of 133 parts of 6-aminocaproic acid and 55.5 parts of calcined sodium carbonate in 750 parts of water was applied instead of the aqueous solution of 32.1 parts of methylamine.

*Example 5*

An undyed fabric of polyamide fibres made from ε-caprolactam-poly-condensates is immersed at a bath ratio of 1:30 at room temperature in a neutral bath containing per litre 0.015 g. of the optical bleaching agent of the following formula

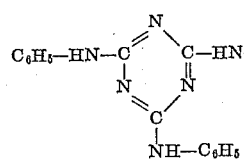 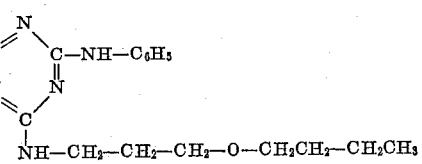

The bath is heated to 60° C. within 10 minutes and the fabric is kept in the bath for a further 20 minutes with occasional stirring. Thereupon the fabric is rinsed in clear water and finally dried. The polyamide fabric shows an excellent optical bleaching effect.

In the same manner, a cotton fabric can be optically bleached in the neutral bath described.

The optical bleaching agent used was prepared according to Example 1 except that in the third condensation stage, besides 332 parts of aniline, 133 parts of 3-(n-butoxy)-propylamine were applied instead of the aqueous solution of 32.1 parts of methylamine.

*Example 6*

A washing powder which contains about 50 percent by weight of ordinary soap and the usual components such as complex forming phosphates, sodium carbonate and alkali silicates, is mixed with 0.1 percent by weight of the optical bleaching agent of the formula

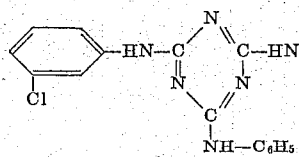

in a manner known per se. Textile materials of cotton or linen are then washed with the washing powder thus obtained in the usual manner—preferably at temperatures between 80–100° C. The textile materials show a very good brightening effect.

Textile materials of polyamide fibres can be washed in the usual manner with the same washing powder containing the aforesaid optical bleaching agent, preferably at temperatures up to 60° C. The textile materials thus treated likewise show a very good brightening effect, although the washing bath has a pH value of about 10.

The optical bleaching agent used was prepared in the following manner:

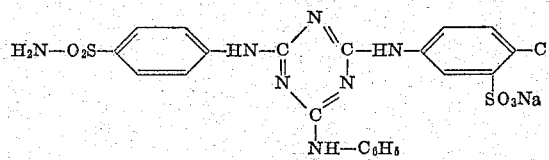

7500 parts of an ice-water mixture were mixed at 0–2° C. with a solution of 369 parts of cyanuric chloride in 4400 parts of acetone; to the suspension of the cyanuric chloride obtained there was added at 3–5° C. the neutral solution of 429 parts of the sodium salt of 4,4-diamino-stilbene-2,2'-disulfonic acid in 3500 parts of water. The mineral acid formed during this first condensation stage was neutralized with sodium carbonate solution until the pH value 7 was reached. After the diamino-stilbene-disulfonic acid was completely reacted, 262 parts of m-chloroaniline were added to the reaction mixture and the hydrochloric acid formed was likewise neutralized with sodium carbonate until the pH value 7 was reached. This second condensation stage was completed by slowly heating the reaction mixture to 35° C. while keeping the pH value at 7. For carrying out the third condensation stage, 32.1 parts of methyl amine in the form of an about 30 percent aqueous solution and 332 parts of aniline were added to the reaction mixture and the mixture was boiled under reflux for 3 hours, whereupon the acetone was distilled off and the remaining solution stirred for 1 hour at 98° C. The pH value of the hot mixture was then adjusted to 5–6 with hydrochloric acid and the mixture was stirred for 1 hour at 80–90° C. The light yellow powdery precipitate was filtered off with suction while hot, washed with hot water and dried; it was applied as optical bleaching agent in the form of a mixture with about 10–20 percent of calcined sodium carbonate.

With the same result a washing agent of the above-mentioned type containing 0.1 percent by weight of the optical bleaching agent of the formula

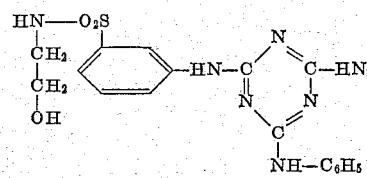

can be used for washing laundry goods of regenerated cellulose, linen or polyamine fibres.

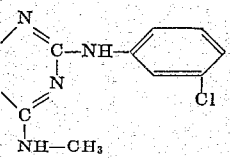

This optical bleaching agent can be prepared according to the above prescription except that in the second condensation stage 262 parts of p-chloroaniline, dissolved in 600 parts of acetone, were applied instead of 262 parts of m-chloroaniline.

*Example 7*

A washing agent which contains about 30 percent by weight of synthetics such as alkyl aryl sulfonates and/or fatty alcohol sulfonates, 5–10 percent by weight of complex forming phosphates, 65–60 percent by weight of sodium sulfate and 0.3 percent by weight of the optical bleaching agent of the formula

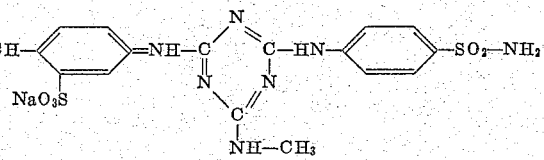

is used in the usual manner for washing laundry goods of regenerated cellulose or polyamide fibres. The washing bath has a pH value of about 8. A very good whitening effect is obtained on undyed laundry goods, whereas laundry goods dyed in light pastel shades appear to be more brilliant.

The optical bleaching agent used was prepared according to Example 6 except that in the second condensation stage, instead of 262 parts of m-chloroaniline, a solution of 316 parts of p-amino-benzene-sulfonamide in a mixture of 870 parts of acetone and 750 parts of water was applied whereupon the reaction mixture was stirred for a further 2 hours in order to complete this second condensation stage while maintaining the pH value at 7.

*Example 8*

3–4 parts of the optical bleaching agent of the formula

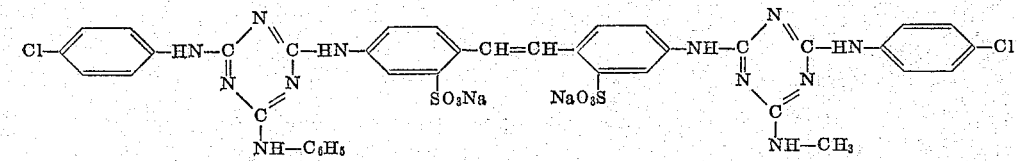

are worked into a rinsing agent which contains complex forming phosphates, sodium silicates, sodium bicarbonate and sodium sulfate, and which serves for removing residues of calcium soaps or the like.

Laundry goods of cellulose fibres or polyamide fibres which are rinsed in a bath of about 40° C. containing a rinsing agent of the aforementioned type show an essentially increased brightness if compared with laundry goods which are treated under equal conditions with a rinsing agent which does not contain the optical bleaching agent.

The optical bleaching agent used was prepared according to Example 6 except that in the second condensation stage, instead of 262 parts of m-chloroaniline, a solution of 526 parts of the hydrochloride of 3-amino-benzene-

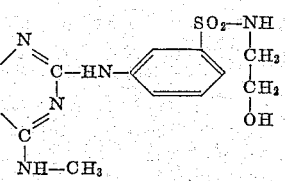

sulfoethanolamide in 2600 parts of water, adjusted to a pH value of 8 with sodium hydroxide solution, was applied, whereupon the reaction mixture was stirred for a further half an hour in order to complete this second condensation stage while maintaining the pH value at 7.

The amounts of optical bleaching agents indicated in the examples can be increased or decreased if necessary; furthermore, the optical bleaching agents can also be applied in combination with chemical bleaching agents, for instance with sodium perborate or with sodium dithionite.

We claim:

A compound of the following formula:

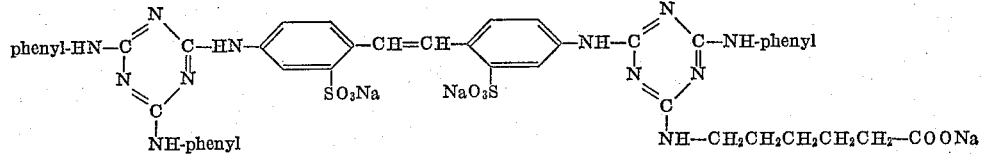

References Cited in the file of this patent

UNITED STATES PATENTS

| | | |
|---|---|---|
| 2,376,743 | Wendt | May 22, 1945 |
| 2,745,830 | Siegrist | May 15, 1956 |
| 2,846,397 | Ackermann | Aug. 5, 1958 |

FOREIGN PATENTS

| | | |
|---|---|---|
| 471,114 | Italy | May 6, 1952 |
| 705,406 | Great Britain | Mar. 10, 1954 |
| 529,326 | Canada | Aug. 1, 1956 |